United States Patent
Bestmann

(10) Patent No.: US 8,234,359 B2
(45) Date of Patent: *Jul. 31, 2012

(54) SYSTEM AND METHOD FOR REMOTELY RE-IMAGING A COMPUTER SYSTEM

(75) Inventor: Martin Bestmann, Neunkirchen am Brand (DE)

(73) Assignee: Absolute Software Corp., Neunkirchen am Brand (DE)

(*) Notice: Subject to any disclaimer, the term of this patent is extended or adjusted under 35 U.S.C. 154(b) by 775 days.

This patent is subject to a terminal disclaimer.

(21) Appl. No.: 11/439,712

(22) Filed: May 24, 2006

(65) Prior Publication Data

US 2008/0010639 A1    Jan. 10, 2008

(51) Int. Cl.
G06F 15/177    (2006.01)
G06F 15/167    (2006.01)
G06F 15/16    (2006.01)
G06F 9/445    (2006.01)
G06F 9/00    (2006.01)

(52) U.S. Cl. ........ 709/222; 709/215; 709/219; 717/178; 713/2

(58) Field of Classification Search ........................ 713/1
See application file for complete search history.

(56) References Cited

U.S. PATENT DOCUMENTS

| | | | |
|---|---|---|---|
| 5,794,052 A * | 8/1998 | Harding | 717/178 |
| 6,094,531 A * | 7/2000 | Allison et al. | 717/176 |
| 6,108,697 A * | 8/2000 | Raymond et al. | 709/218 |
| 6,253,300 B1 | 6/2001 | Lawrence et al. | |
| 6,658,435 B1 | 12/2003 | McCall | |
| 6,845,392 B2 * | 1/2005 | Koontz et al. | 709/219 |
| 6,857,011 B2 * | 2/2005 | Reinke | 709/220 |
| 6,920,555 B1 | 7/2005 | Peters et al. | |
| 6,959,320 B2 * | 10/2005 | Shah et al. | 709/203 |
| 6,963,981 B1 * | 11/2005 | Bailey et al. | 726/22 |
| 7,346,765 B2 | 3/2008 | Graham et al. | |
| 7,512,833 B1 | 3/2009 | Murphy et al. | |
| 2004/0088367 A1 * | 5/2004 | Reinke | 709/215 |
| 2004/0117414 A1 * | 6/2004 | Braun et al. | 707/204 |
| 2005/0038879 A1 * | 2/2005 | Himmel et al. | 709/220 |
| 2005/0086457 A1 | 4/2005 | Hohman | |
| 2005/0177743 A1 * | 8/2005 | Barber et al. | 713/191 |
| 2005/0268337 A1 * | 12/2005 | Norton et al. | 726/23 |
| 2005/0283456 A1 | 12/2005 | Graham et al. | |
| 2006/0005064 A1 * | 1/2006 | Graham et al. | 714/2 |
| 2006/0010315 A1 | 1/2006 | Brown et al. | |
| 2006/0031425 A1 * | 2/2006 | Nelson et al. | 709/220 |
| 2006/0036658 A1 | 2/2006 | Henrickson | |
| 2006/0036890 A1 | 2/2006 | Henrickson | |
| 2006/0036895 A1 | 2/2006 | Henrickson | |
| 2007/0277033 A1 * | 11/2007 | Bestmann | 713/165 |
| 2008/0010639 A1 * | 1/2008 | Bestmann | 718/100 |
| 2008/0126357 A1 * | 5/2008 | Casanova et al. | 707/10 |

* cited by examiner

*Primary Examiner* — Ian N Moore
*Assistant Examiner* — Kiet Tang
(74) *Attorney, Agent, or Firm* — Howison & Arnott, L.L.P.

(57) ABSTRACT

The present disclosure relates generally to systems and methods for remotely re-imaging a computer system. In one example, a method is provided for executing a re-imaging process for replacing an original image on an active system of a remote computer system with a new image. The method includes receiving a command to initiate the re-imaging process from a remote location and downloading the new image onto the active system. The re-imaging process is performed to replace the original image with the active image and remote location may be informed of the re-imaging process's success. The computer system is rebooted.

18 Claims, 6 Drawing Sheets

SYSTEM AND METHOD FOR REMOTELY RE-IMAGING A COMPUTER SYSTEM

CROSS REFERENCE

This application is related to U.S. patent application Ser. No. 11/439,711, entitled "METHOD FOR RE-IMAGING A COMPUTER SYSTEM", filed on May 24, 2006, which is hereby incorporated by reference in its entirety.

BACKGROUND

Computer systems rely on memory media for storage. Such media include hard drives, removable disks, and memory sticks that may be formatted for use with devices such as magnetic or optical writers and readers. Files and directory structures stored on the media, including data and executable instructions (e.g., programs), form an image commonly referred to as a disk image.

As the disk image on a computer system may be corrupted or lost due to software errors or hardware failure, a copy of the disk image may be stored elsewhere for use in restoring the computer system to the state represented by the disk image. The process of restoring the disk image generally involves over-writing the previous disk image. This re-imaging process typically involves wiping the disk or other storage media and writing the disk image onto the wiped disk.

Alternatively, a computer system's disk image may be overwritten by another disk image during, for example, an upgrade process. In this case, the original disk image may be operating normally, but the re-imaging may result in the original disk image being overwritten by the new disk image.

However, current re-imaging processes are limited, and new and improved methods for re-imaging are needed.

SUMMARY

In one embodiment, a method for executing a re-imaging process for replacing an original image on an active system of a remote computer system with a new image is provided. The method comprises receiving a command to initiate the re-imaging process from a remote location and downloading the new image onto the active system. The re-imaging process is performed to replace the original image with the active image and remote location is informed of the re-imaging process's success. The computer system is rebooted, wherein no reboot is needed between the receiving the command and performing the re-imaging process.

In another embodiment, a method for executing a re-imaging process for replacing an original image on an active system of a remote computer system with a new image is provided. The method comprises defining a plurality of settings and files that are to be preserved from the original image during the re-imaging process. A command is issued to execute an agent process on the remote computer system for initiating the re-imaging process. The agent process is instructed to save the defined plurality of setting and files that are to be preserved and a response is waited for from the agent indicating success or failure of the re-imaging process.

In still another embodiment, a system for re-imaging a remote active system is provided. The system includes a first computer, and a second computer coupled to the first computer, wherein the second computer includes the active system. The system also includes a plurality of instructions for execution on the first computer including instructions for issuing a command to execute an agent process on the second computer for initiating the re-imaging process. The system further includes a plurality of instructions for execution on the second computer including instructions for receiving the command to initiate the re-imaging process and instructions for copying a new image to the active system, wherein the new image is to replace an original image on the active system. The plurality of instructions for execution on the second computer also include instructions for performing the re-imaging process to replace the original image with the active image, and instructions for rebooting the computer system, wherein no reboot is needed between the receiving the command and performing the re-imaging process.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
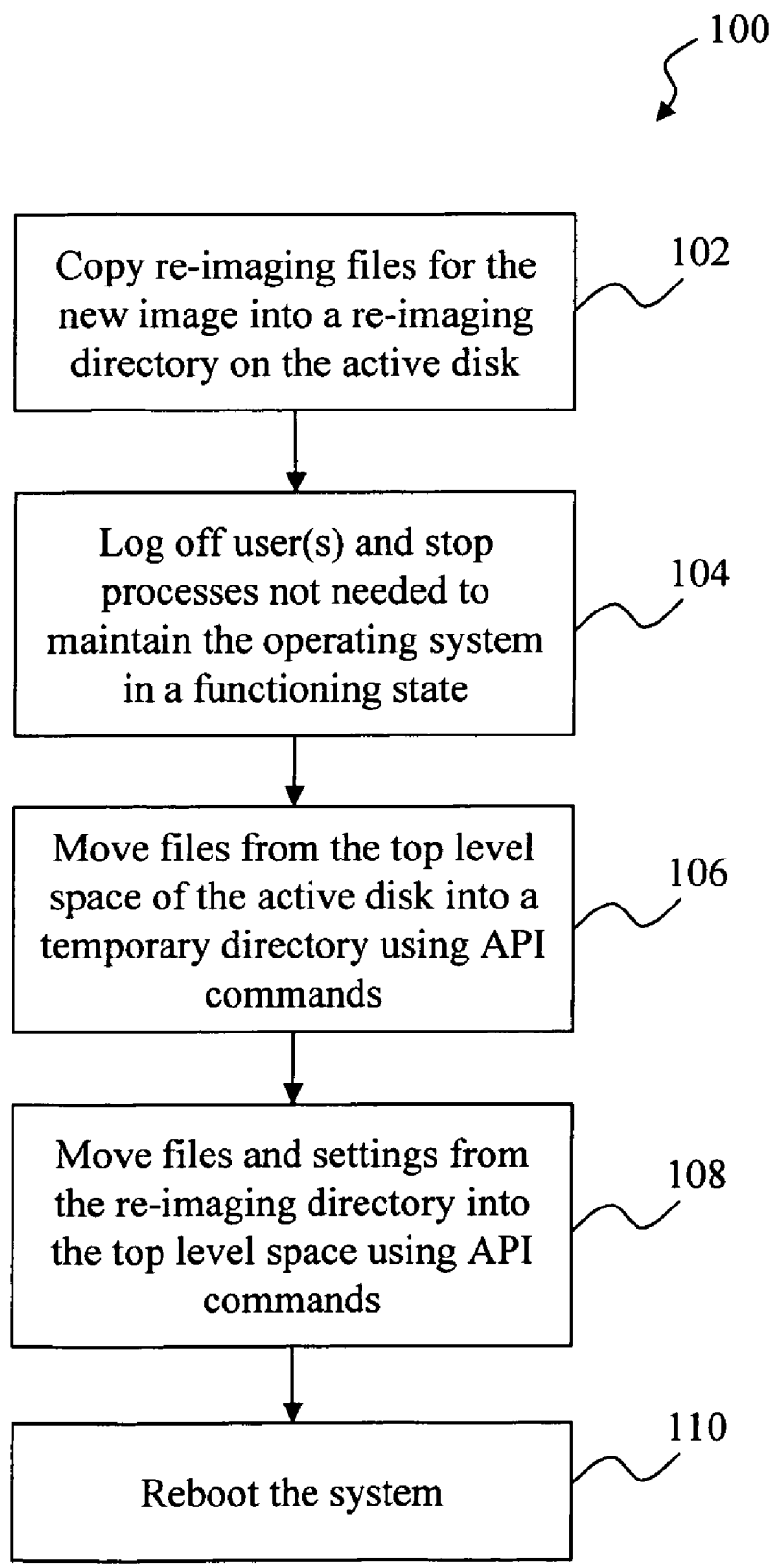
FIG. 1 is a flowchart illustrating one embodiment of a method for re-imaging a computer system.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a method 100 for re-imaging an active system (e.g., an active disk) in a computer system is illustrated. The method 100 enables a portion of the re-imaging to occur while a user is using the computer system, and does not require a reboot from the time the re-imaging process is initiated until a final phase of the re-imaging is reached. Accordingly, user productivity may be increased as the computer system is unusable for a shortened amount of time compared with other re-imaging processes.

In step 102, re-imaging files for a new (or backup) image may be copied into a re-imaging directory on the computer system disk. It is understood that the term "re-imaging directory" is for purposes of illustration and does not necessarily indicate a special type of directory. In the present embodiment, the re-imaging directory may be created on the active disk by the re-imaging process prior to the copying of the files, but a previously existing directory may be used if desired. Furthermore, the directory may not be protected from access by the operating system controlling the disk and so may not provide a protected environment for the files that it contains. Although not shown in FIG. 1, the new (or backup) image may be mounted prior to copying the files into the re-imaging directory. For example, the new image may be mounted if the new image is not stored locally on the computer system. The mounting may be, for example, via remote storage (e.g., a file server), a local image file, or through use of a portable memory device.

Although not shown, in some embodiments, files and settings (e.g., user and/or network settings) may be copied from the active disk into the re-imaging directory. The re-imaging directory may be organized in the same manner as the active disk, and the files and settings may be copied into a location within the re-imaging directory identical to their location on the active disk. Accordingly, the file structure of the active disk may be maintained. The files and settings to be copied may be selected by a user (e.g., an administrator) or may default to a predefined configuration.

During step 102 (and during mounting and/or copying user files and settings, if applicable), a user may be actively using the computer system and accessing the active disk. Accordingly, to the user, the computer system may not appear to be undergoing a re-imaging process. For example, if the computer system is networked, the re-imaging process may be initiated by an administrator via the network without the user's knowledge and without the administrator needing to physically access to the computer system.

In step 104, any user currently logged into the computer system is logged off and any unneeded processes are stopped. In the present embodiment, an unneeded process is a process that can be stopped without rendering the operating system inoperable (i.e., a needed process is required to maintain the operating system in a functioning state). Accordingly, some processes may typically be identified as needed and allowed to continue running. At this point, the user can no longer access the computer system.

In step 106, files from the active disk's top level (e.g., operating system files and libraries) are moved into a temporary directory. The method 100 uses system level application programming interface (API) commands to move the files. The use of system level API commands avoids the use of tools that may make calls to structures such as dynamic libraries that have been or are being moved or otherwise rendered unavailable (e.g., in step 104), which may render the computer system inoperable. Accordingly, the movement of the top level files is performed in such a way as to minimize the need for higher level processes.

In step 108, the files from the re-imaging directory are moved to the top level space of the active disk. As with the movement in step 106, the files are moved using system level API calls to avoid the use of tools that may make calls that would render the system inoperable. From steps 106 through steps 110, any calls outside of the system level API calls may be minimized or eliminated to maintain the system in a functioning state.

In step 110, the computer system is rebooted. During the reboot process, any files that were in use (and could not be moved or overwritten) during steps 106 and/or 108 may be moved to complete the re-imaging process.

In the present embodiment, it is noted that the terms "copying" and "moving" may have different meanings. For example, "copy" may represent reading the contents of a file into memory and then saving it again, while "moving" may represent changing an entry in the directory structure map on the disk. As such, copying a file may take longer than moving a file (e.g., one hour to copy versus one half second to move), although the time savings provided by moving may be applicable only when the target location of the move is on the same volume. In addition, because files may be moved in a relatively small amount of time, moving the files (as opposed to copying the files) may shorten the time between steps 106 and 110 and minimize the risk that an existing process may make a call to a tool that is no longer functional (e.g., because a file needed for the tool may have been moved in step 106). It is understood that these terms are described for purposes of illustrating the present embodiment and are not intended to be limiting.

Figure 2:
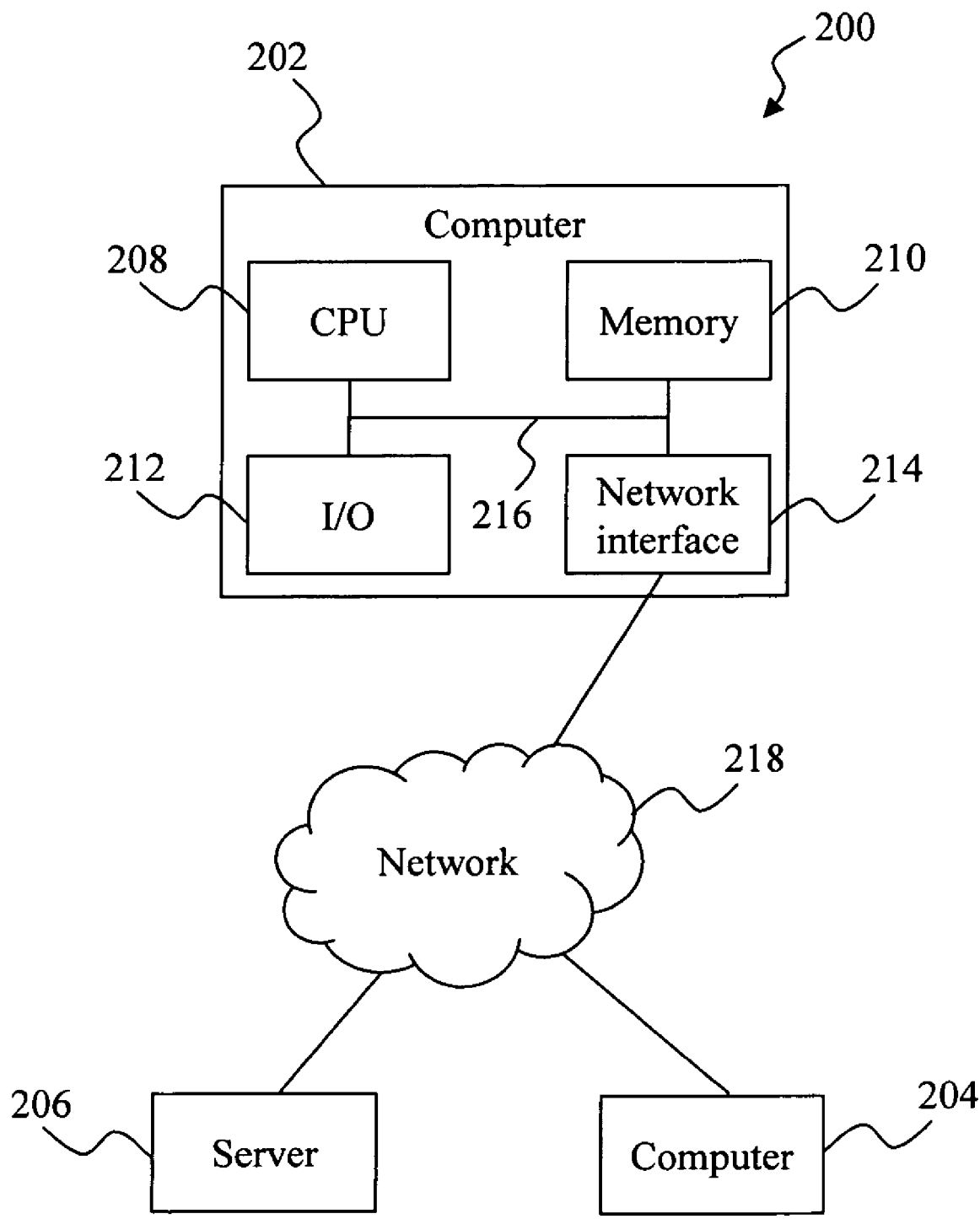
FIG. 2 is a diagram of one embodiment of a computer system within which the method of FIG. 1 may be executed.

Referring to FIG. 2, in one embodiment, a computer system 200 illustrates an environment within which the method 100 of FIG. 1 may be implemented. Although the system 200 is shown with networked computers 202 and 204, it is understood that the present disclosure may be used with a single non-networked computer. Furthermore, other networked components such as a server 206 may be included in the system 200.

As an illustration of an exemplary computer, the 202 may include a central processing unit ("CPU") 208, a memory unit 210, an input/output ("I/O") device 212, and a network interface 214. The components 208, 210, 212, and 214 are interconnected by a bus system 216. It is understood that the computer may be differently configured and that each of the listed components may actually represent several different components. For example, the CPU 208 may actually represent a multi-processor or a distributed processing system; the memory unit 210 may include different levels of cache memory, main memory, hard disks, and remote storage locations; and the I/O device 212 may include monitors, keyboards, and the like.

The computer 202 may be connected to a network 218 via the network interface 214, which may be wired or wireless. The network 218 may be representative of several networks, such as a local area network, a company wide intranet, and/or the Internet. Because the computer 202 may be connected to the network 218, certain components may, at times, be shared with other computers (not shown). Therefore, a wide range of flexibility is anticipated in the configuration of the computer. It is understood that, although a conventional computer is illustrated in FIG. 2, the term "computer" in the present disclosure may refer to any device that includes a processor and a memory for storing data.

The computers 202 and 204 may be using any operating system, including various versions of operating systems provided by Microsoft (such as WINDOWS), Apple (such as Mac OS X), UNIX, and LINUX. While the following examples are described with respect to an Apple OS X environment, it is understood that the present disclosure may be applied to any operating system Referring to FIGS. 3a-3c, in another embodiment, a method 300 for re-imaging a system is provided. The method 300 may use an agent present on the system to initiate the re-imaging by calling a re-imaging tool that handles the actual re-imaging. As will be described in greater detail with respect to FIG. 4, in embodiments where the system being re-imaged is networked, the agent may communicate with a remote computer and download the new image from the network.

Figure 3A:
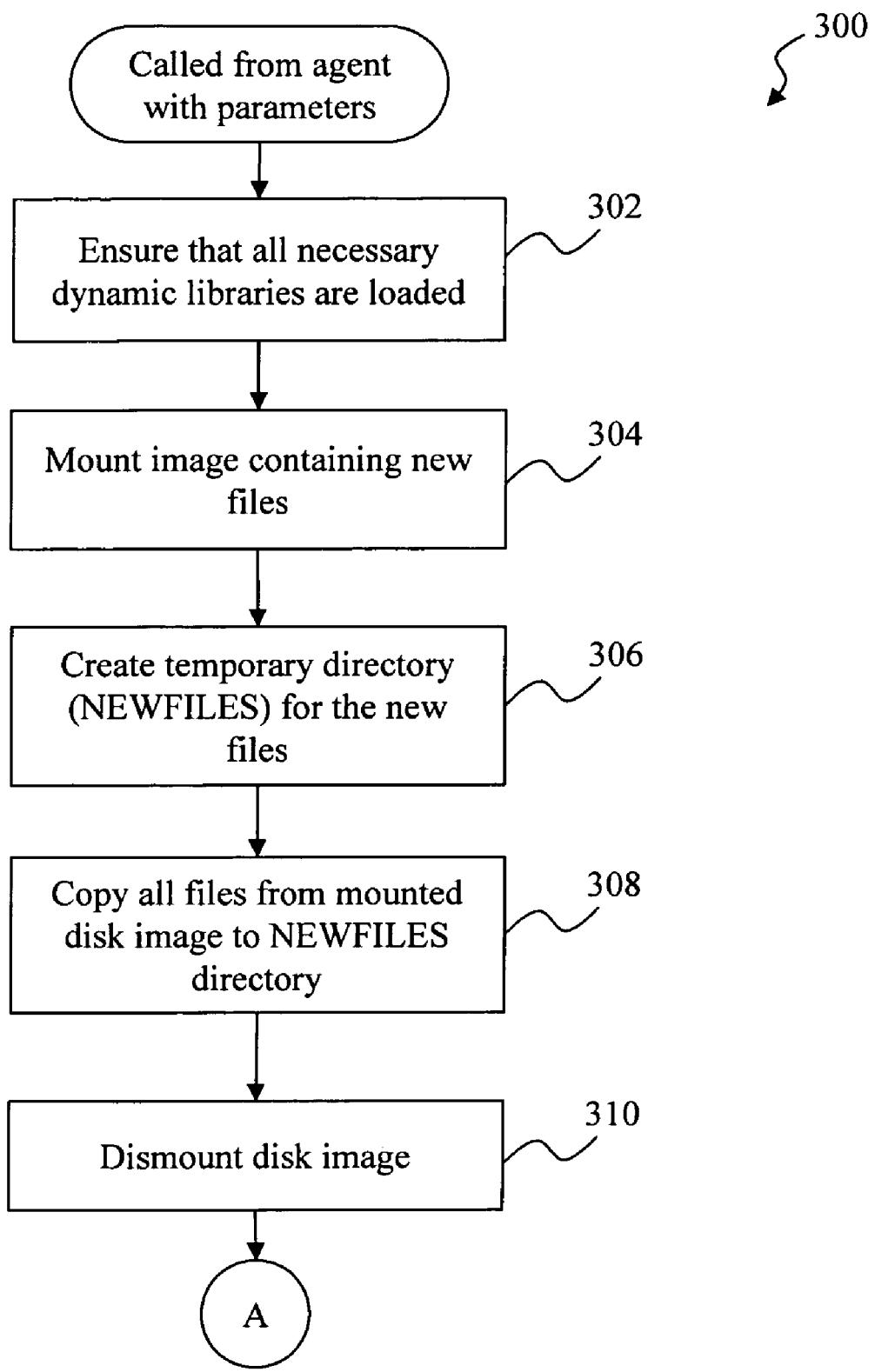
FIGS. 3a-3c are a flowchart illustrating another embodiment of a method for re-imaging a computer system.

With specific reference to FIG. 3a, in step 302, the method 300 ensures that all necessary dynamic libraries are loaded. The libraries may be needed by the re-imaging tool to accomplish one or more of the following steps, and may also be needed to mount the new image. For example, certain API calls may need access to libraries that may or may not be loaded when the method 300 begins. Step 302 may ensure that any such libraries are loaded using an API such as "void (*signal(int, void (*)(int)))(int);". In the present embodiment, the API may be called with the following parameter: "signal (SIGHUP, &_OnHUPSignal);". This may be the first call made or may be a later call. In step 304, the new image is mounted. As described previously, the new image may be mounted only if needed, and may be mounted from a remote storage, a local image file, a portable drive, or from other media.

In step 306, a temporary directory (e.g., NEWFILES) is created in which to store the new files contained within the new image. Although shown following step 304, step 306 may occur at any time after the initiation of the method 300. In step 308, the new files are copied from the mounted image into the NEWFILES directory. The copying may be performed using any of a variety of tools known to those in the art. For example, the copying may use relatively high-level tools that rely on processes and libraries that are not essential for the continued operation of the operating system that controls the active disk. While the copying is occurring, a user may continue to use the system in a normal manner. In step 310, the image may be dismounted from the system after the files have been copied into the NEWFILES directory. It is understood that step 310 may occur at any time after step 308 or may be omitted entirely in some embodiments.

Figure 3B:
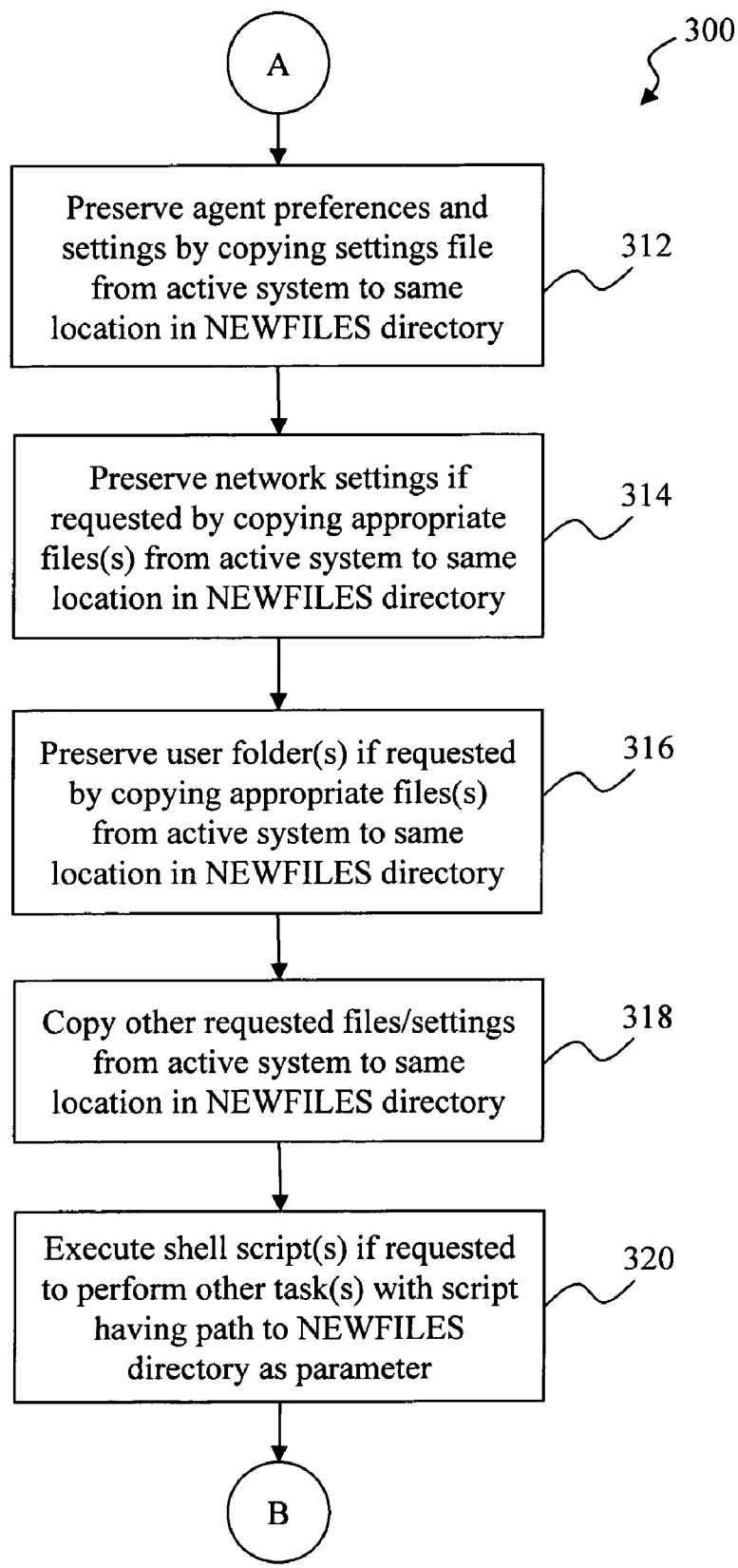

With specific reference to FIG. 3b, agent preferences and settings (e.g., of the agent initiating and controlling the re-imaging) may be preserved by copying information, such as a settings file, from the active system to the same location in the NEWFILES directory in step 312. This avoids loss of the information and preserves the information's location with respect to the directory structure of the active system.

In steps 314, 316, and 318, additional files, folders, and settings may be copied from the active system to the NEWFILES directory as specified. The files and other data to be copied may be specified by an administrator or other user, or may be specified by a predefined or default configuration. More specifically, in step 314, network settings may be copied from the active system to the same location in the NEWFILES directory if a request to copy the files has been entered. In step 316, user folder(s) may be copied from the active system to the same location in the NEWFILES directory if a request to copy the files has been entered. The user folders to be copied may be specified for a particular user (e.g., the user currently logged into the system), for all users of the system, or for a particular subset of users. In step 318, any other files and/or settings that are to be saved may be copied from the active system to their same location in the NEWFILES directory. The copying in steps 312, 314, 316, and 318 may be performed using any of a variety of tools known to those of skill in the art.

In step 320, one or more scripts (e.g., a shell script) may be executed if specified. Such a script may be executed to perform any number of tasks as defined by the administrator, and may be provided with a path to the NEWFILES directory as a parameter. It is understood that, in some embodiments, preceding steps may be accomplished by the use of such scripts. Furthermore, it is understood that any or all of steps 312, 314, 316, 318, and 320 may be omitted, and the steps may be performed in any order.

Figure 3C:
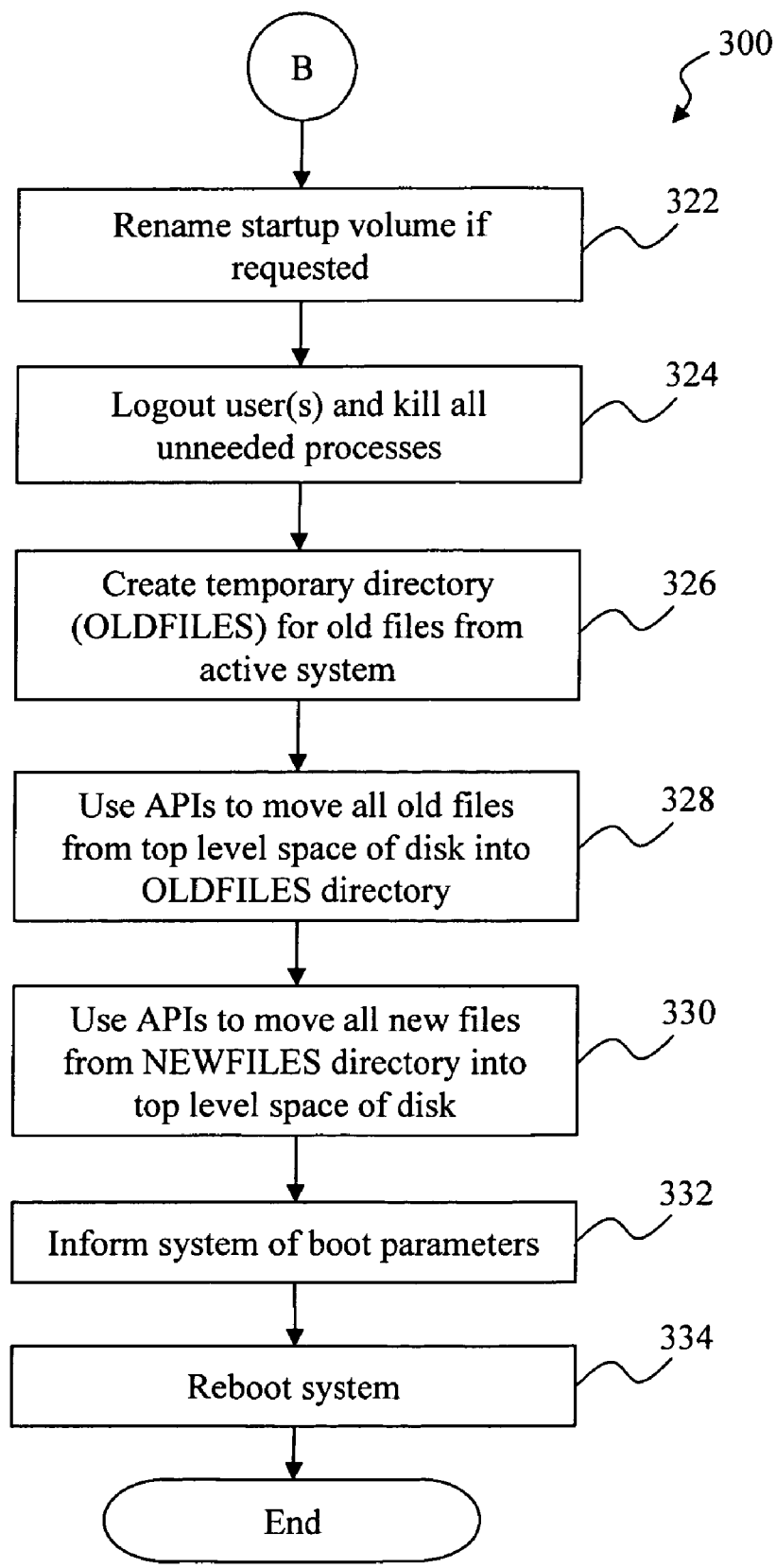

With specific reference to FIG. 3c, the startup volume name may be changed in step 322 if specified. For example, the administrator may specify a new name for the drive to indicate that it has been re-imaged or to associate it with another user. It is understood that step 322 may occur at any time after the method 300 is initiated (and prior to the execution of step 334 in the present example), and may be omitted entirely in some embodiments.

Step 324 of the method 300 logs out all users that are logged into the system (if any) and kills all unneeded processes. In the present example, a needed process is one that is required to prevent the operating system controlling the active system from being rendered inoperable (i.e., an unneeded process is not required to maintain the operating system in a functioning state). However, it is understood that other processes may be defined as needed if desired. Logging off all users and stopping all unneeded processes enables the active system to be reduced to a relatively few active files and reduces the possibility that a call will be made to a file that has been moved in a later step. It is understood that step 324 may occur at any time after the method 300 is initiated (and prior to the execution of step 328 in the present example)

In step 326, a temporary directory (OLDFILES) is created (although this directory may also be created in an earlier step). In some embodiments, a pre-existing directory may be used. It is understood that step 326 may occur at any time after the method 300 is initiated (and prior to the execution of step 328 in the present example). In step 328, all files may be moved from the top level space (e.g., the root directory) of the active disk to the OLDFILES directory. In some embodiments, the NEWFILES directory may be created in the top level space and would not be moved during step 328. This process may be performed relatively quickly (e.g., approximately 0.5 seconds to two seconds). In the present example, the process of moving the files is performed solely with calls to the system level API (e.g., using a call such as "int rename (const char *, const char *);" in a UNIX based system). The exclusive use of system level API calls ensures that the re-imaging tool will not make a call to a library that has not been loaded (step 302) or to a file that has been moved. For example, if the re-imaging tool were to use a regular copy tool to move the files, the tool would likely make library calls to perform its functions. As the libraries may have already been moved, this might render the system inoperable. The use of system level API calls in conjunction with the loading of any needed libraries avoids this possibility.

In step 330, the files and directory structure in the NEWFILES directory are moved to the top level space on the active disk. As with step 328, the process of performing the move is accomplished using only system level API calls. As various settings, user files and folders, and other information were saved from the active system (now in the OLDFILES directory) to the NEWFILES directory, this information will be available once the re-imaging is complete.

In step 332, any needed boot parameters are given to the system. For example, if the system is a Mac OS X based system, step 332 would entail blessing the system. In step 334, the system is rebooted (e.g., with a hard reboot). In some embodiments, files may be moved or copied during the reboot process. In addition, the OLDFILES directory may be deleted during the reboot process.

Although not shown with respect to FIGS. 3a-3c, modifications may be made to ensure that files that are in use are saved during the re-imaging process. For example, in some operating systems (e.g., UNIX), a file that is open or busy may be deleted or moved to a new location. However, in other operating systems (e.g., MICROSOFT WINDOWS XP), a file that is open generally cannot be moved. Accordingly, in such a system, if a file is open during step 316 and step 316 is performed before step 324, the file itself or changes to the file may be lost after re-imaging. To prevent such loss, a mechanism may be employed to identify files that are active when the copying of step 316 occurs. The identified files may then be copied after step 324 is performed. For example, the identified files may be copied before or following reboot (step 334). If such a mechanism is not employed and the operating system operates in such a manner that busy files or file changes may be lost, step 324 may be performed before step 312. Other variations to ensure that files are saved for use after re-imaging may also be provided.

Accordingly, the method 300 enables a computer system to be re-imaged. A user of the computer system may continue to access the system until a certain phase of the method 300 is reached (step 324) and so the effect of the re-imaging is minimized with respect to user productivity. In addition, as various files and settings of the original image may be transferred to the new image, the computer system may be available for use as soon as it is rebooted.

Figure 4:
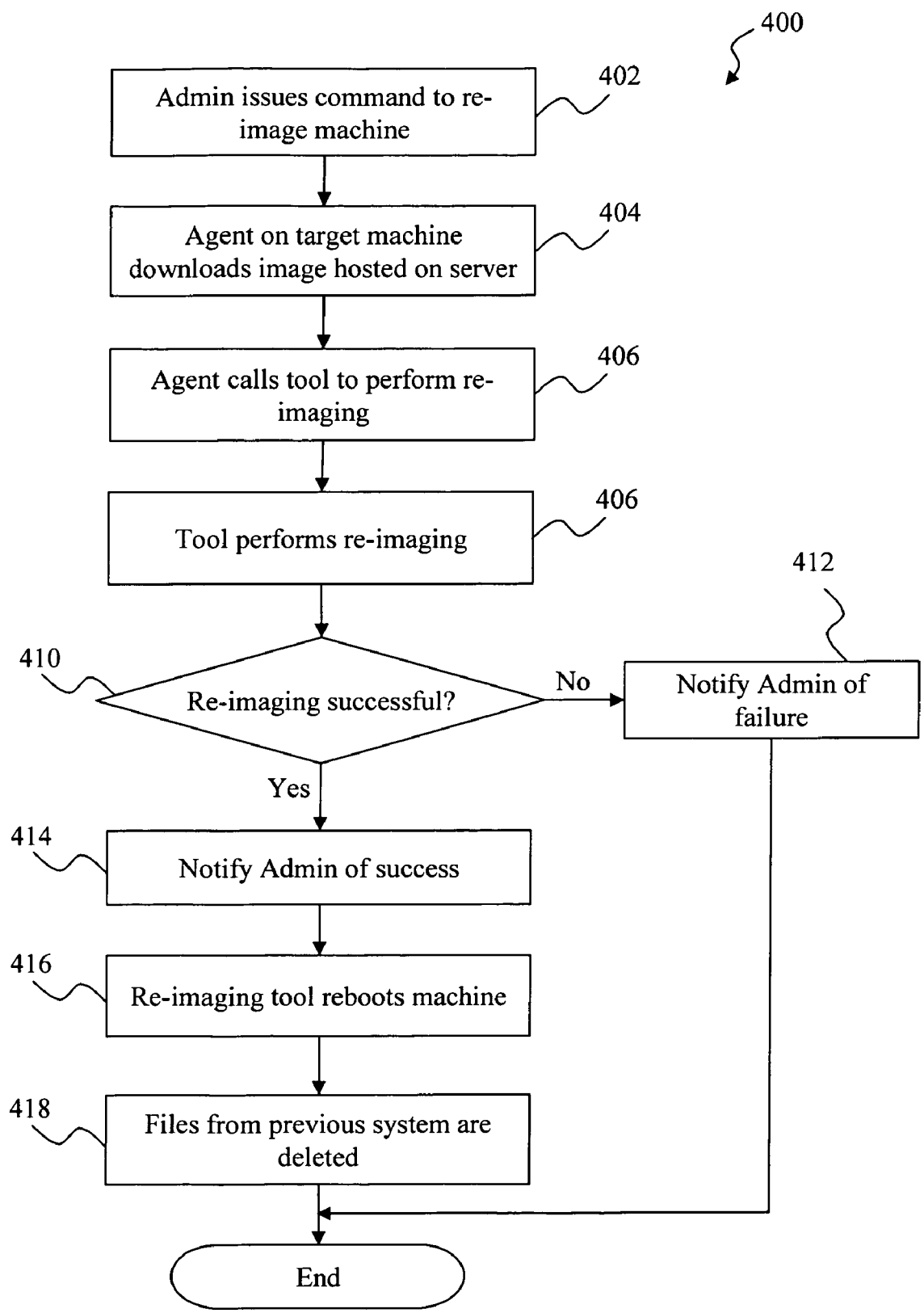
FIG. 4 is a flowchart of a method for remotely re-imaging a computer system.

Referring to FIG. 4, in another embodiment, a method 400 may be used to re-image one or more computers accessible via a computer network. For example, a system administrator may use the computer 202 of FIG. 2 to re-image computer 204. In the present example, the image to be used in the re-imaging process may be stored in another location, such as on the server 206.

In step 402, a system administrator or another user having the appropriate network and computer access rights issues a command from the computer 202 to re-image the computer 204. The command may be entered in any of a variety of ways, such as using a graphical user interface or a command line. Parameters may also be provided with the re-image command, including a location of the image to be used and which of various files and/or settings are to be saved (as described previously). In the present example, the command is issued to an agent residing on the computer 204.

In step 404, the agent on the computer 204 downloads the image from the server 206 and initiates the re-imaging process by calling a re-imaging tool in step 406. In the present example, the re-imaging tool is part of a package containing the agent and so is located on the computer 204. In other embodiments, the re-imaging tool may be downloaded to the computer 204 prior to or after activation of the agent, may be stored and executed on a remote system (e.g., the computer 202 or the server 206), or may be stored on any other accessible remote storage device.

In step 408, although not described in detail in the present example, the re-imaging tool performs a re-imaging process as described previously. For example, all or portions of method 100 of FIG. 1 or method 300 of FIGS. 3a-3c may be executed by the re-imaging tool to re-image the computer 204.

In step 410, a determination is made as to whether the re-imaging was successful. The determination may be made by the agent on the computer 204 or the agent may send information to the computer 202 to enable the computer 202 to determine whether the re-imaging was successful. In the present example, if the re-imaging was not successful, the method 400 moves to step 412, where a message is sent to the administrator notifying the administrator of the failure before the method ends.

If the re-imaging was successful, the method 400 moves to step 414, where a message is sent to the administrator notifying the administrator of the successful re-imaging. In step 416, the re-imaging tool reboots the computer 204 (although this may occur prior to sending the message in step 412). Files from the previous system (e.g., the OLDFILES directory described with respect to FIGS. 3a-3c) may be deleted during the reboot process.

Accordingly, the method 400 enables a re-imaging process to be initiated for a remote computer. Various parameters may accompany the command to configure the re-imaging process to save files and settings and to perform other functions. The administrator or other user initiating the re-imaging process need not have physical access to the computer being re-imaged. It is understood that multiple computers in a network may be re-imaged simultaneously, providing an advantage to administrators of large organizations. Furthermore, such re-imaging may occur on a scheduled basis to minimize work interruptions. For example, the command to re-image may be scheduled (e.g., send the command at 3:00 AM) or the re-imaging itself may be scheduled (e.g., instruct the agent to initiate the re-imaging at 3:00 AM). Although not described in detail, it is understood that various modifications may be made to the methods described herein. For example, the agent may be configured to notify an administrator or write to a log after certain steps are completed. Such notifications may aid in diagnosing a reason for failure if the re-imaging process is not successful.

Although only a few exemplary embodiments of this disclosure have been described in details above, those skilled in the art will readily appreciate that many modifications are possible in the exemplary embodiments without materially departing from the novel teachings and advantages of this disclosure. Furthermore, various steps may be omitted, combined, split into additional steps, or performed in a different order than that shown. Also, features illustrated and discussed above with respect to some embodiments can be combined with features illustrated and discussed above with respect to other embodiments. Accordingly, all such modifications are intended to be included within the scope of this disclosure.

What is claimed is:

1. A method for executing a re-imaging process for replacing an original image on an active system of a remote computer system with a new image comprising:
   receiving a command to initiate the re-imaging process from a remote location;
   downloading the new image onto the active system;
   performing the re-imaging process to replace the original image with the new image, wherein performing the re-imaging process includes:
      stopping processes not needed to maintain an operating system running on the active system in an operable state;
      moving files and settings in the original image from a top level space of the active system into a temporary directory using system level application programming interface (API) commands; and
      moving files from a re-imaging directory in which files for the new image are stored on the active system into the top level space using system level API commands;
   informing the remote location of the re-imaging process's success; and
   rebooting the computer system after the original image is replaced with the new image, wherein no reboot occurs during a time interval defined by a start time at which the command to initiate the re-imaging process is received and an end time at which this rebooting occurs.

2. The method of claim 1 further comprising deleting files of the original image when rebooting the computer system.

3. The method of claim 1 further comprising activating an agent resident on the computer system after receiving the command, wherein the agent executes the re-imaging process.

4. The method of claim 1 wherein stopping processes not needed to maintain the operating system running on the active system in an operable state includes logging off any user currently logged into the active system.

5. The method of claim 1 further comprising preserving at least a portion of settings and files from the original image by copying the portion of the settings and files into an identical location in the re-imaging directory.

6. The method of claim 5 wherein the copying the portion of the settings and files into an identical location in the re-imaging directory occurs prior to stopping processes not needed to maintain the operating system running on the active system in an operable state.

7. The method of claim 1 further comprising identifying a plurality of files corresponding to the original image that are to be saved during the re-imaging process, wherein the files are available on the remote computer system after rebooting the computer system.

8. The method of claim 1 further comprising identifying a plurality of settings corresponding to the original image that are to be saved during the re-imaging process, wherein the settings are available on the remote computer system after rebooting the computer system.

9. The method of claim 1 wherein downloading the new image onto the active system includes accessing the new image on a remote storage device.

10. A method for executing a re-imaging process for replacing an original image on an active system of a remote computer system with a new image comprising:
   defining a plurality of settings and files that are to be preserved from the original image during the re-imaging process;
   issuing a command to execute an agent process on the remote computer system for initiating the re-imaging process;
   instructing the agent process to save the defined plurality of settings and files that are to be preserved;
   performing, by the agent process, the re-imaging process to replace the original image with the new image, wherein the remote computer system is not rebooted between a first time defined by the issuing the command to execute the agent process and a second time that occurs after the original image has been replaced with the new image and wherein performing the re-imaging process includes:
      stopping processes not needed to maintain an operating system running on the active system in an operable state;
      moving files and settings in the original image from a top level space of the active system into a temporary directory using system level application programming interface (API) commands; and
      moving files from a re-imaging directory in which files for the new image are stored on the active system into the top level space using system level API commands; and
   waiting for a response from the agent process indicating success or failure of the re-imaging process.

11. The method of claim 10 wherein the command identifies a location of the new image to be used in the re-imaging process.

12. The method of claim 10 wherein the agent is part of the original image.

13. The method of claim 10 further comprising downloading the agent to the remote computer system before issuing the command.

14. A system for re-imaging a remote active system comprising:
   a first computer having a first processor and a first memory coupled to the first processor;
   a second computer having a second processor and a second memory coupled to the second processor, wherein the second computer is coupled to the first computer, and wherein the second computer includes the active system;
   a plurality of instructions stored in the first memory for execution on the first processor of the first computer including:
      instructions for issuing a command to execute an agent process on the second computer for initiating the re-imaging process; and
   a plurality of instructions stored in the second memory for execution on the second processor of the second computer including:
      instructions for receiving the command to initiate the re-imaging process;
      instructions for copying a new image to the active system, wherein the new image is to replace an original image on the active system;
      instructions for performing the re-imaging process to replace the original image with the new image, wherein the instructions for performing the re-imaging process include instructions for:
         stopping processes not needed to maintain an operating system running on the active system in a functional state;
         moving files and settings in the original image from a top level space of the active system into a temporary directory using system level application programming interface (API) commands; and
         moving files from a re-imaging directory in which files for the new image are stored on the active system into the top level space using system level API commands; and
      instructions for rebooting the second computer, wherein no reboot occurs from a time at which the command to initiate the re-imaging process is received until a time after the original image has been replaced with the new image, and wherein this is the first reboot to occur after the original image is replaced with the new image.

15. The system of claim 14 wherein the instructions for stopping processes not needed to maintain the operating system running on the active system in a functional state include instructions for logging off any user currently logged into the active system.

16. The system of claim 14 wherein the plurality of instructions for execution on the first computer include instructions for defining a plurality of settings and files that are to be preserved from the original image during the re-imaging process and instructing the agent process to preserve the defined plurality of setting and files.

17. The system of claim 16 wherein the plurality of instructions for execution on the second computer include instructions for preserving the plurality of settings and files from the original image by copying the plurality of settings and files to an identical location in a re-imaging directory on the active system.

18. The system of claim 14 wherein the plurality of instructions for execution on the second computer include instructions for notifying the first computer of whether the re-imaging was successful.

* * * * *